March 27, 1951 G. C. WEINGARDT 2,546,708
COVER VENT
Filed Oct. 18, 1946 2 Sheets-Sheet 1
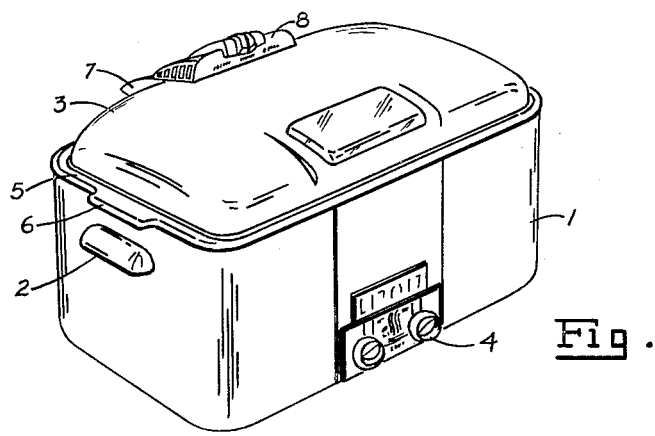
Fig. I
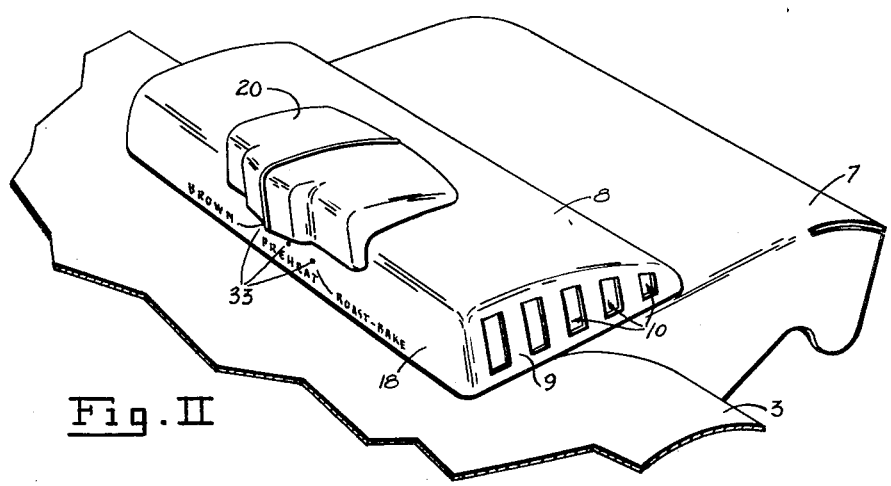
Fig. II
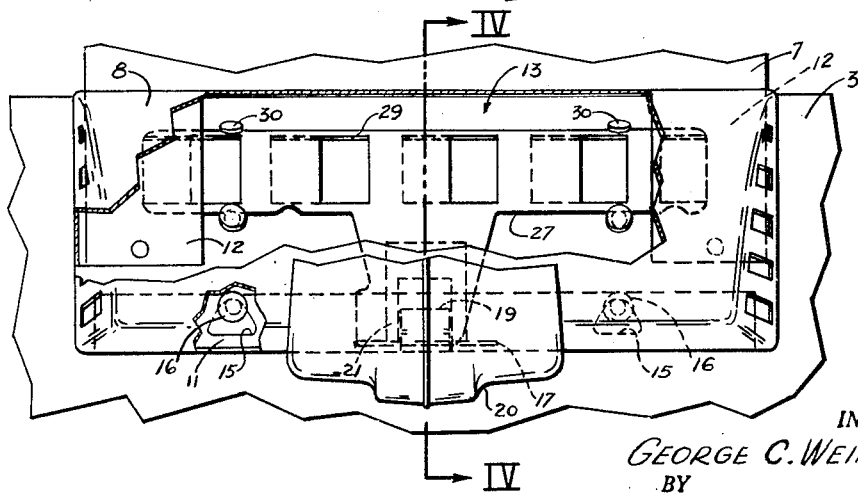
Fig. III
INVENTOR.
GEORGE C. WEINGARDT
BY
Marshall and Marshall
ATTORNEYS

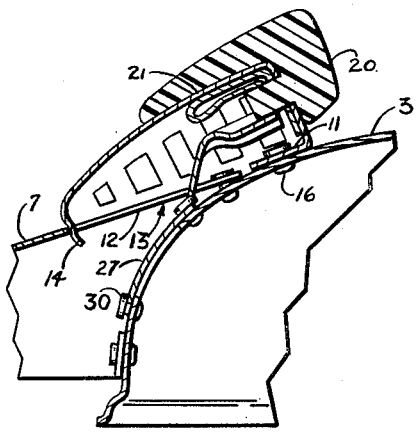
Fig. IV
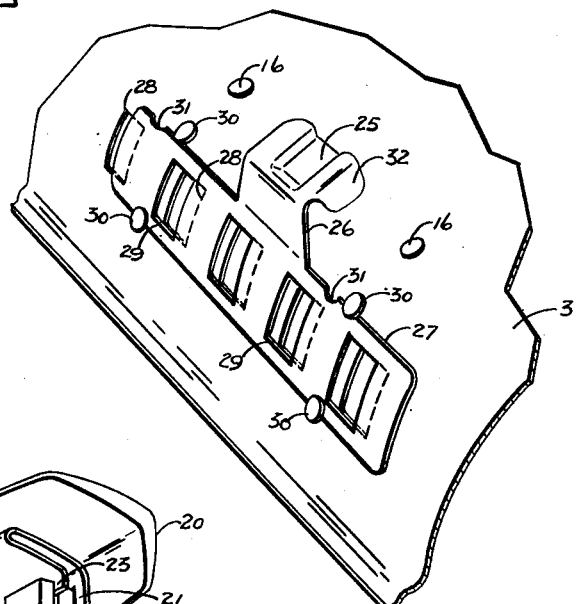
Fig. V
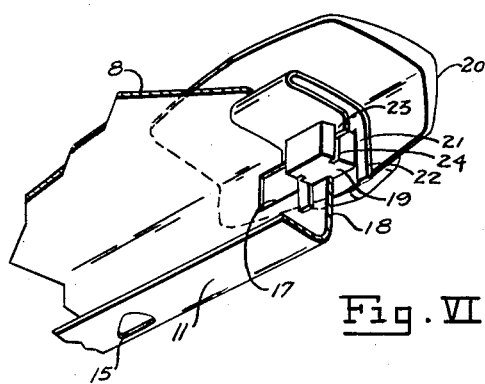
Fig. VI
INVENTOR.
GEORGE C. WEINGARDT
BY
Marshall and Marshall
ATTORNEYS Patented Mar. 27, 1951

2,546,708

UNITED STATES PATENT OFFICE 2,546,708

COVER VENT

George C. Weingardt, Toledo, Ohio, assignor to The Swartzbaugh Manufacturing Company, Toledo, Ohio, a corporation of Ohio Application October 18, 1946, Serial No. 703,950

7 Claims. (Cl. 220—44)

This invention relates to cover vents for food roasters and, more particularly, to mechanisms for closing and opening such vents.

It is well known in the cooking art that if meats, for example, are prepared in a vessel which is tightly closed and the vapors and steam which rise from the meat during cooking are not permitted to escape from the vessel they will condense on the cover or other upper cool portion of the vessel and gradually drip back onto the meat or into the vessel. The prevention of the escape of the vapors may be desirable during certain portions of the cooking process since it obviates the constant addition of water to the cooking vessel in order to prevent the food from being burned. However, if it is desired to "brown" the exterior of the meat it is necessary that a large percentage of the moisture and vapor be permitted to escape from the cooking vessel so that the outside of the meat will gradually be dried by the continued heat and while being dried will cook to a considerably greater degree than the interior of the meat thus "browning" the outside of the meat. If the roaster is used for baking pastries, cakes or other items, it may be desirable to permit the escape of some of the moisture (to prevent sogginess) but to retain some of the moisture to prevent a hard crust from being formed.

Electric roasters, which term is used generically to describe vessels of the type having electrical resistance wires wrapped or located around the vessel so that heat is applied to the vessel from several sides, have been equipped with adjustable vents which permit the control of the cooking process by controlling the quantity of moisture permitted to escape from the roasters. Many of these vents consist merely of holes through the covers of the roasters which can be entirely closed or opened to varying degrees by rotating cut-out disks over the holes to the desired degree. Many of these vents have the disadvantage that the escaping vapor is very likely to burn the fingers of a person operating the vent. Furthermore, because they are securely attached to the cover and because certain of the vapors may condense while passing through the vents or against the vents if they are closed, it is difficult to clean such vents because they cannot easily be disassembled.

It is an object of this invention to provide a cover vent for an electric roaster which is easy to clean.

It is another object of this invention to provide a cover vent for a roaster in which the escaping gases do not pass near the finger control for the vent and thus to obviate burning the operator's fingers.

It is a further object of this invention to provide a cover vent for a roaster in which the escaping heated gases create a "chimney action" within the vent housing which causes cool outside air to rush into the housing and mingle with the escaping vapors thus "scavenging," as it were, the interior of the roaster.

It is a further object of this invention to provide a cover vent for a roaster in which outside air is blended with escaping vapors prior to their emission outside the roaster thereby condensing the moisture carried by the vapors and cooling them before reaching the point where an operator's fingers could be scalded.

These and more specific objects and advantages are apparent from the description, in which reference is had to the accompanying drawings illustrating a preferred embodiment of the invention.

In the drawings:

Figure I is a perspective view of an electric roaster equipped with a cover vent embodying the invention.

Figure II is a greatly enlarged fragmentary perspective view of the exterior of a cover vent mechanism embodying the invention.

Figure III is a fragmentary plan view of the cover vent mechanism, certain parts being broken away to more clearly show the operation.

Figure IV is a fragmentary vertical sectional view taken substantially on the line IV—IV of Figure III.

Figure V is a fragmentary perspective view of a portion of the vent mechanism shown in Figures III and IV.

Figure VI is a fragmentary perspective view of other portions of the vent mechanism shown in Figures III and IV.

An electric roaster of the type with which the instant invention is adapted to be employed may comprise an outer housing 1 having lifting handles 2 and a hinged cover 3. The roaster may also be equipped with temperature and other control knobs 4 and may have a removable cooking pan 5 which is equipped with lift handles 6.

A hinged bracket 7 is riveted or otherwise secured at the rear of the cover 3. The hinged bracket 7 cooperates with another bracket (not shown) attached to the upper rear of the housing 1 for hinging the cover 3. A formed vent housing 8 is removably mounted on the cover 3 and bracket 7 overlying the junction between these two parts of the roaster and enclosing the vent mechanism. The housing 8 has end walls 9 which are pierced with a plurality of openings 10 and a backwardly turned horizontally extending lip 11 which, when the housing 8 is in place, lies on the upper surface of the cover 3. The hinge bracket 7 is bifurcated at its forward end where it is attached to the cover 3 having two arms 12 which are riveted to the cover 3 and between which there is formed a rectangular opening 13. The vent housing 8 has a downwardly turned lip 14 at its rear edge and a pair of openings 15 pierced in the lip 11. The openings 15 are engageable with a pair of buttons 16 riveted on the cover 3. The vent housing 8 is mounted on the cover 3 and the bracket 7 by engaging the rear edges of the openings 15 with the buttons 16 and pressing the lip 14 downwardly to engage it with the edge of the bracket 7 extending between the arms 12. To remove the vent housing 8 the lip 14 is disengaged from the edge of the bracket 7 and the vent cover 8 slid rearwardly a sufficient distance to disengage the edges of the openings 15 from the buttons 16. The vent housing 8 can then be lifted off the cover 3 and bracket 7.

The vent housing 8 has a horizontally extending slot 17 (Figures III and VI) pierced through its forward substantially vertical wall 18. A block 19 formed on the interior of a molded slide 20 extends through the slot 17 into the interior of the vent housing 8. The slide 20 is retained in place with its block 19 extending into the interior of the vent housing 8 by a formed bifurcated resilient clip 21. The clip 21 has a U-shaped body one end of which terminates in two arms 22 which extend vertically on opposite sides of the block 19 and the other end of which is formed into another pair of arms 23 each of which is engaged is a vertical slot 24 cut in the end of the block 19. As can be seen most clearly in Figures IV and VI the clip 21 lies immediately beneath the inside of the upper and front portions of the vent housing 8 grasping the block 19 and thus snugly holding the slide 20 against the exterior of the vent housing 8. When it is desired to remove the slide 20 the body of the clip 21 is squeezed together to disengage its arms 23 from the slots 24 so that the block 19 can be withdrawn with between the arms 22 of the clip 21 and through the slot 17.

The block 19 is engageable in a depression 25 formed in an upwardly extending arm 26 of a vent slide 27. A series of rectangular vents 28 is pierced in the cover 3 near its rear edge extending horizontally from each other. The vents 28 can be closed, partially closed or fully opened by positioning the vent slide 27 which has a series of pierced openings 29 of which there is one less than the number of vents 28 in the cover 3. The vent slide 27 is mounted in four buttons 30 riveted to the cover 3 and overlying the upper and lower edges of the vent slide 27. In Figure IV the vent slide 27 is shown in the position where the vents 28 are entirely closed, the vent slide 27 being in its midposition. In Figure V the vent slide is shown moved slightly to the left (Figure III) with the vents 28 partially opened.

The upper edge of the vent slide 27 has two semicircular notches 31 which, when the vent slide 27 is moved to its extreme left position (Figure III) fall in line with the upper pair of buttons 30 so that the vent slide can be rocked rearwardly slightly to disengage the upper pair of buttons 30 through the notches 31 and then lifted slightly to disengage the lower edge of the vent slide 27 from the lower pair of buttons 30. The vent slide 27 can then be removed by dropping it downwardly and rearwardly beneath the hinge bracket 7. The arm 26 of the vent slide 27 has a laterally extending lip 32 adjacent one side of the depression 25.

To assemble the vent mechanism on the roaster cover the vent slide 27 is first placed with its lower edge engaged beneath the edges of the pair of buttons 30 and then swung down against the surface of the cover 3 with the notches 31 passing the upper pair of buttons 30. The vent slide 27 is then slid to the right (Figure III) or upwardly and to the left (Figure V). The block 19 of the slide 20 is then inserted through the slot 17 in the vent housing 8 and the clip 21 compressed so that it can be engaged with the block 19 as shown in Figure VI. The slide 20 is then slid to the left of the slot 17 (Figure II) and the rear edges of the openings 15 engaged beneath the two buttons 16. The vent housing 8 is then swung downwardly and rearwardly to insert the clip 14 beneath the rear edge of the opening 13. The block 19 of the slide 20 is not as yet engaged in the depression 25 of the vent slide arm 26 but by moving the slide 20 to the right (Figure III) the block 19 engages the lip 32 springing the arm 26 downwardly and allowing the block 19 to slide over the edge and into the depression 25. Being slightly resilient, the arm 26 then presses the bottom of the depression 25 against the underside of the block 19 holding the two parts in engagement.

As the slide 20 is moved back and forth in the slot 17 the vent slide 27 also is moved back and forth across the vents 28. The relative positions of the vents 28 and openings 29 depends upon the position of the slide 20. In Figure II it can be seen that three standard positions are provided for the slide 20. These are indicated by dots 33 stamped on the exterior of the front wall 18 of the vent housing 8 which carry the position indicia "Brown," "Preheat," "Roast-Bake" (reading from left to right in Figures II and III) and which correspond to open, closed, and partially open positions of the vents 28. The vapors which escape from the interior of the roaster through the vents 28 and openings 29 in the vent slide 27 rise upwardly through the opening 13 formed by the arms 12 of the bracket 7 and into the interior of the vent housing 8 escaping therefrom through the openings 10 in its end walls. This prevents the vapors from striking the fingers of an operator moving the slide 20.

Thus by moving the slide 20 the person using the roaster can preset the vents to the proper degree of "openness" to control the cooking process in the desired manner, i. e. to permit or restrict the escape of vapors and to bake or brown the roast or other food being cooked in the roaster without danger of the fingers being scalded by escaping vapors. The vent mechanism can be disassembled by reversal of the steps outlined above and the mechanism thoroughly cleaned.

The general construction of the vent mechanism whereby escaping vapors are discharged into a vent housing into which outside air rises from beneath the bracket 7 and through the opening 13 to mingle with these vapors produces a "chimney draft" action which carries the vapors out of the vent housing 8 tending to "scavenge" the interior of the roaster and cooling the vapors thereby condensing considerable of the steam before emitting the vapors to the outside air. This not only assures a more positive venting of the roaster but it also obviates the escape of steam out of the roaster and prevents any accidental scalding of an operator's fingers or condensation of the steam on the exterior of the roaster or surrounding walls or cabinets.

The embodiment of the invention which has been disclosed may be modified to meet various requirements.

Having described my invention, I claim:

1. Vent control means for a roaster cover having a vent, comprising, in combination, a removable vent housing overlying said vent, a movable vent closing member located in said housing, a manually operable member mounted on the exterior of said housing and resilient interlocking means for disengageably connecting said members.

2. Vent means for a roaster cover comprising, in combination, a vent in said roaster cover, a vent housing overlying said vent and having a portion forming a "chimney-like" hood for the entrance of outside air into said housing, said vent housing having apertures in its walls and means for opening said vent selected degrees.

3. Vent means for a roaster cover comprising, in combination, a vent in said roaster cover, a vent housing overlying said vent and having a downwardly open overhanging portion forming a "chimney-like" hood for the entrance of outside air into said housing, said vent housing having apertures in its walls and means for opening said vent selected degrees.

4. Vent control mechanism for a roaster having a vented cover comprising, in combination, a vent mechanism housing having apertures in its sides, a vent closing member located within said housing, a manually operable slide located on the exterior of said housing and means on said member and on said slide for drivingly and disengageably connecting said member and said slide.

5. Vent control mechanism for a roaster having a vented cover comprising a vent mechanism housing removably mounted on said cover over said vents, said housing having apertures in its wall not in line with the vents in said cover, a vent closing slide removably mounted on said cover within said housing, a manually operable slide mounted on the exterior of said housing and having a projection extending into said housing through another aperture in the wall thereof, resilient means for retaining said manually operable slide on said housing and means for detachably connecting said projection to said vent closing slide.

6. Vent control means for the cover of a food roaster having a vented area therein comprising, in combination, an apertured slide movable over the vented area of said cover to vary the area of the vents, a vent housing mounted on said cover overlying the vents and having an imperforate top and a "hood portion" extending beyond the edge of said cover, there being apertures in certain of the vertical walls of said housing, a vent actuating knob mounted exteriorly of said housing and having a projection extending within said housing, and means for detachably connecting said slide to said projection.

7. Vent control means for a roaster cover comprising, in combination, a vent housing overlying said vent and having a "hood portion" extending beyond one edge of said cover, said housing having an imperforate top and apertures in certain of its walls, a perforated vent closing member slidably mounted on said cover beneath said housing, a manually actuatable member slidably mounted on the exterior of said housing and having a projection extending into said housing through an aperture in the wall thereof located beneath said member, resilient means for detachably connecting said projection to said perforated vent closing member, and resilient means acting between said projection and said manually actuatable member for retaining said manually actuatable member on said housing.

GEORGE C. WEINGARDT.

REFERENCES CITED

The following references are of record in the file of this patent:

UNITED STATES PATENTS

| Number | Name | Date |
|---|---|---|
| 1,294,942 | Crawiec | Feb. 18, 1919 |
| 2,187,762 | Uhlrig | Jan. 23, 1940 |
| 2,255,503 | Carbary | Sept. 9, 1941 |
| 2,415,613 | Sulak | Feb. 11, 1947 |